E. M. COBB.
MACHINE FOR MAKING SOLDER HEMMED CAPS.
APPLICATION FILED NOV. 2, 1906.

1,009,474.

Patented Nov. 21, 1911.
9 SHEETS—SHEET 1.

WITNESSES:
A. C. Perry.
A. G. McPherson.

INVENTOR
Elmer M. Cobb
BY
ATTORNEY

E. M. COBB.
MACHINE FOR MAKING SOLDER HEMMED CAPS.
APPLICATION FILED NOV. 2, 1906.

1,009,474.

Patented Nov. 21, 1911.
9 SHEETS—SHEET 3.

Fig. 4ᵃ

Fig. 6ᵃ

WITNESSES:
A. G. Berry
A. G. McPherson

INVENTOR
Elmer M. Cobb
BY
ATTORNEY

E. M. COBB.
MACHINE FOR MAKING SOLDER HEMMED CAPS.
APPLICATION FILED NOV. 2, 1906.
1,009,474.
Patented Nov. 21, 1911.
9 SHEETS—SHEET 4.
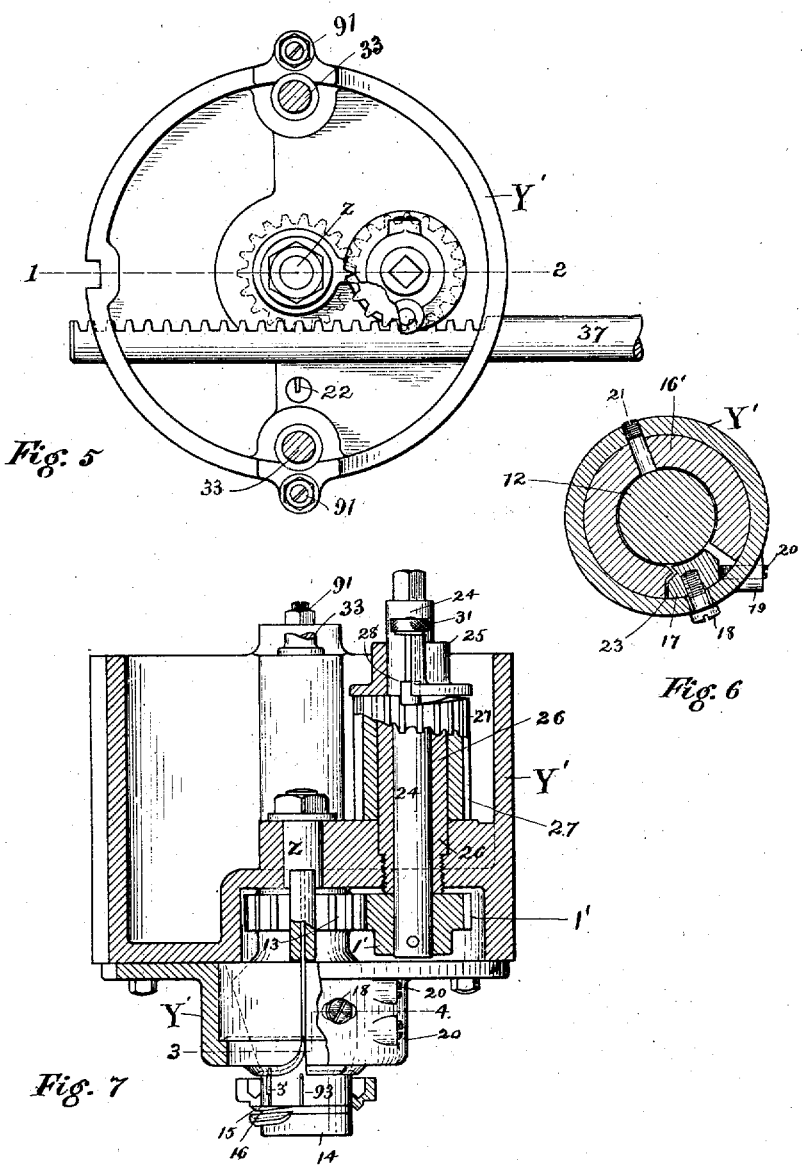
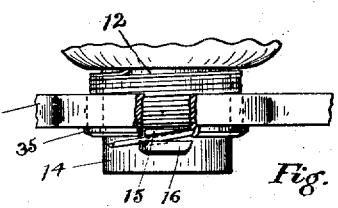
WITNESSES:
INVENTOR
ATTORNEY

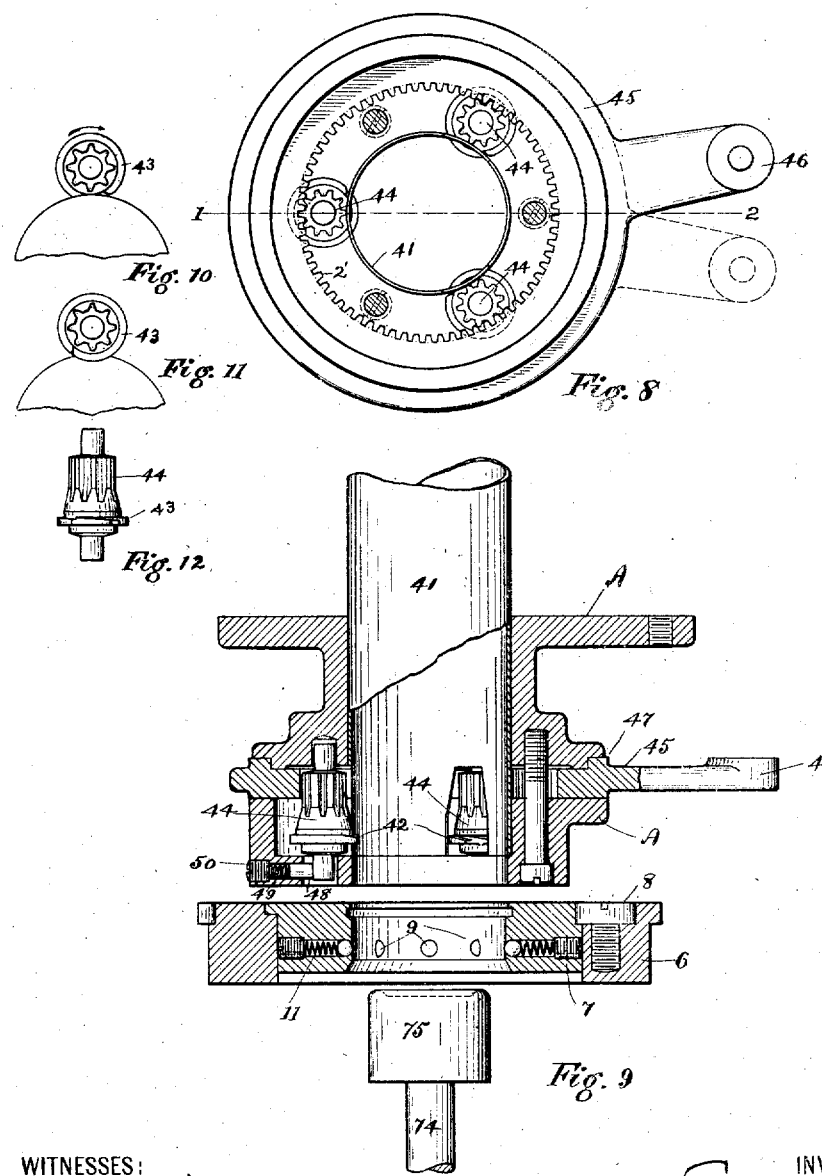

E. M. COBB.
MACHINE FOR MAKING SOLDER HEMMED CAPS.
APPLICATION FILED NOV. 2, 1906.

1,009,474.

Patented Nov. 21, 1911.

9 SHEETS—SHEET 6.

WITNESSES:
A. C. Berry
A. G. McPherson

INVENTOR
Elmer M. Cobb
BY
ATTORNEY

E. M. COBB.
MACHINE FOR MAKING SOLDER HEMMED CAPS.
APPLICATION FILED NOV. 2, 1906.
1,009,474.
Patented Nov. 21, 1911.
9 SHEETS—SHEET 7.
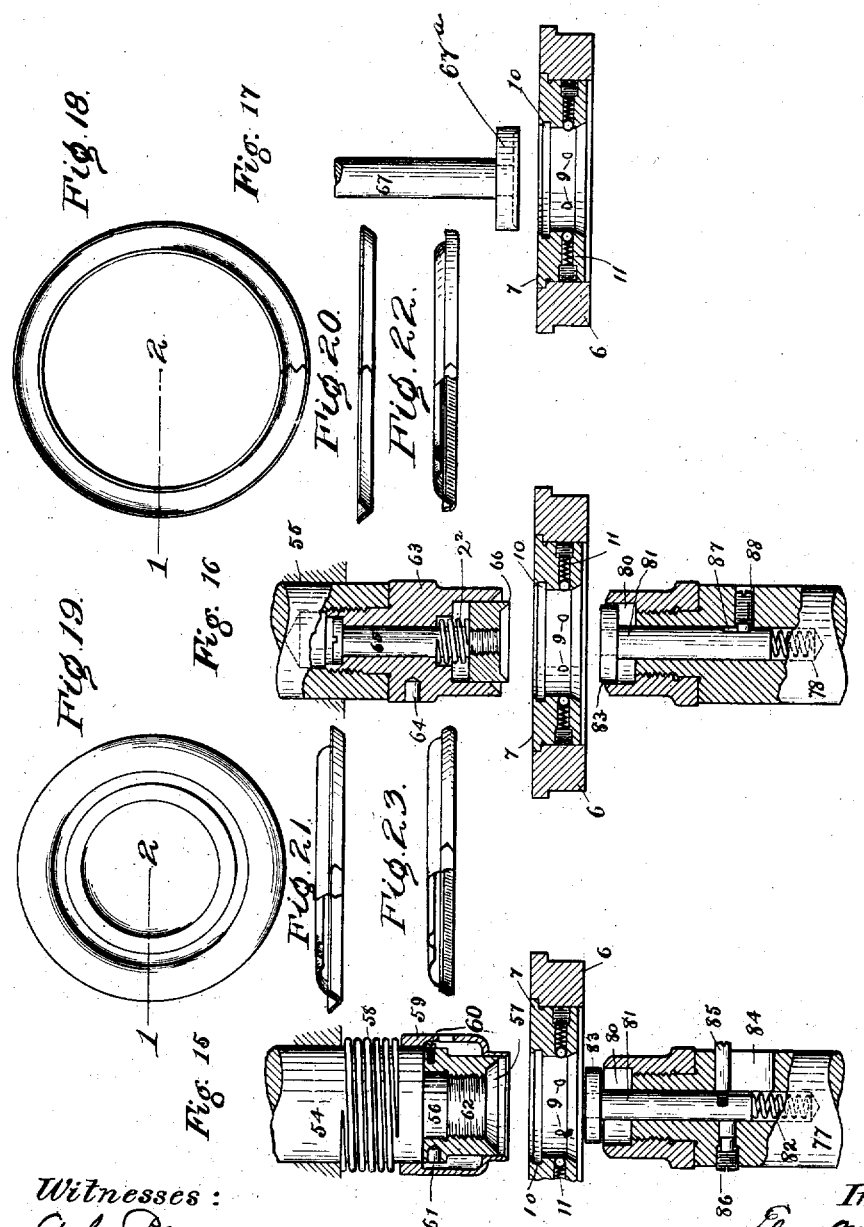

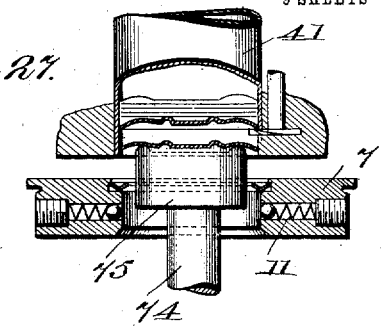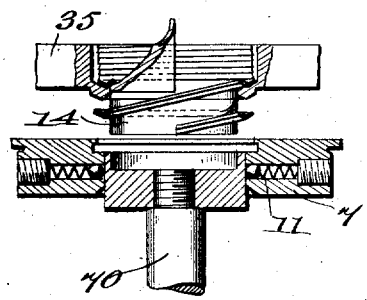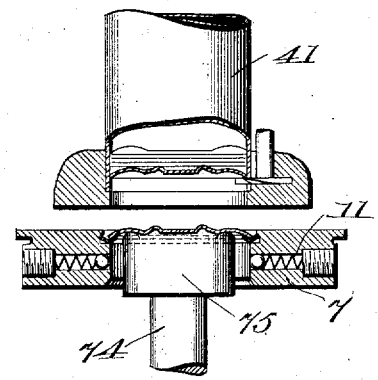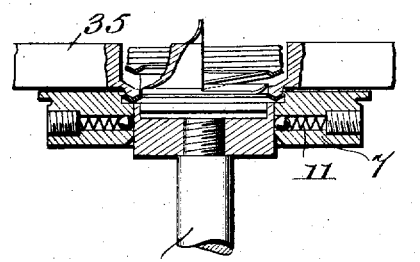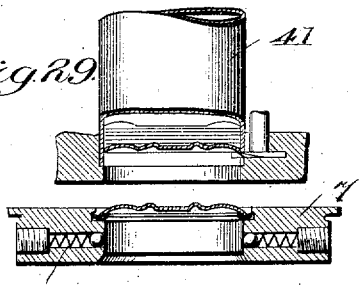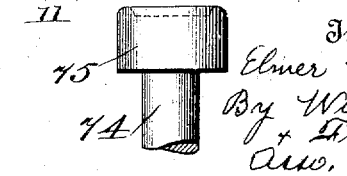

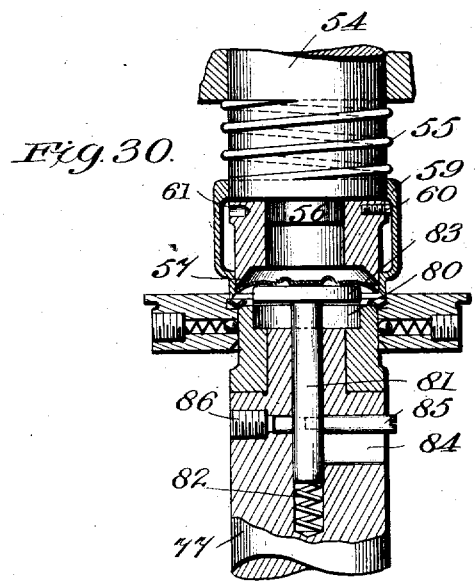
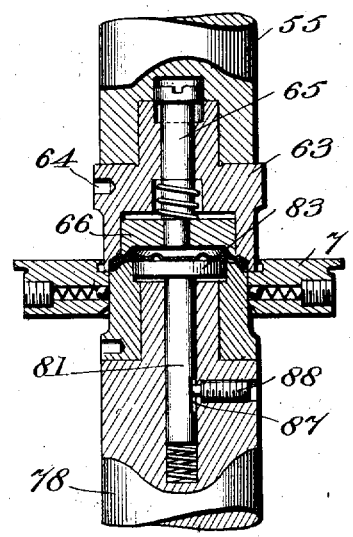
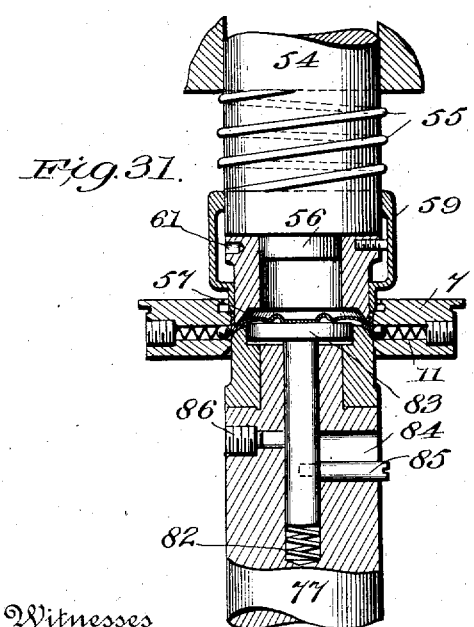
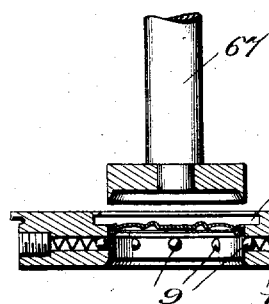

UNITED STATES PATENT OFFICE.

ELMER M. COBB, OF SOUTH PORTLAND, MAINE, ASSIGNOR TO EDWARD M. LANG, JR., OF PORTLAND, MAINE.

MACHINE FOR MAKING SOLDER-HEMMED CAPS.

1,009,474.  Specification of Letters Patent.  Patented Nov. 21, 1911.

Application filed November 2, 1906. Serial No. 341,757.

*To all whom it may concern:*

Be it known that I, ELMER M. COBB, a citizen of the United States, residing at South Portland, in the county of Cumberland and State of Maine, have invented a Machine for Making Solder-Hemmed Caps; and I hereby declare that the following is a full, clear, and exact description of the invention, which will enable others skilled in the art to which it appertains to make and use the same.

My invention relates to machines for the purpose of providing solder hemmed caps whereby caps or studs intended for the closing of cans used for hermetically sealing goods may be provided with a hem of solder.

Figure 1:
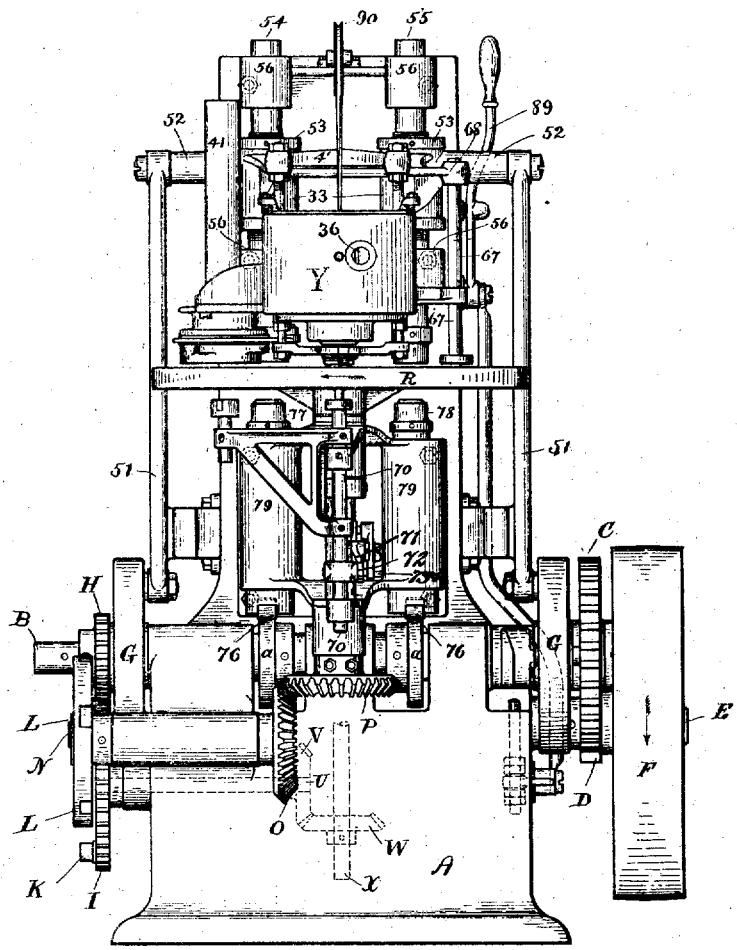
Figure 2:
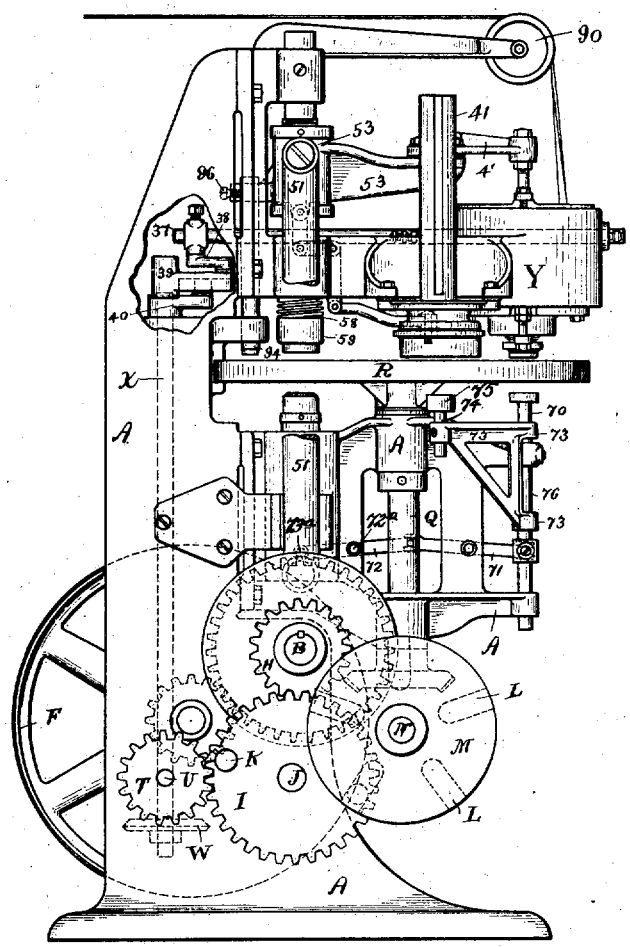
Figure 3:
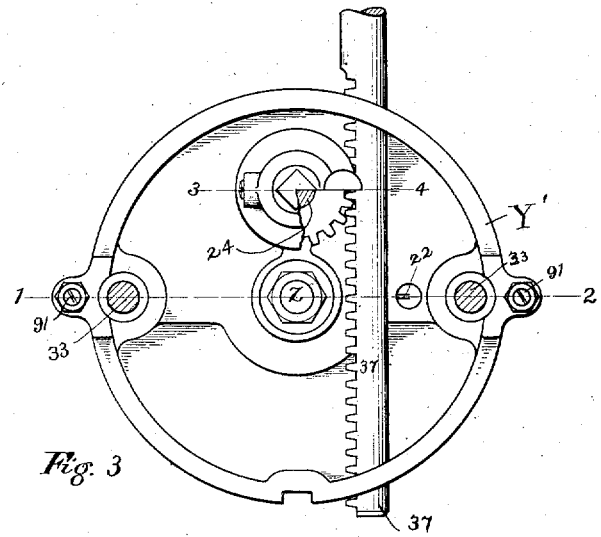
Figure 4:
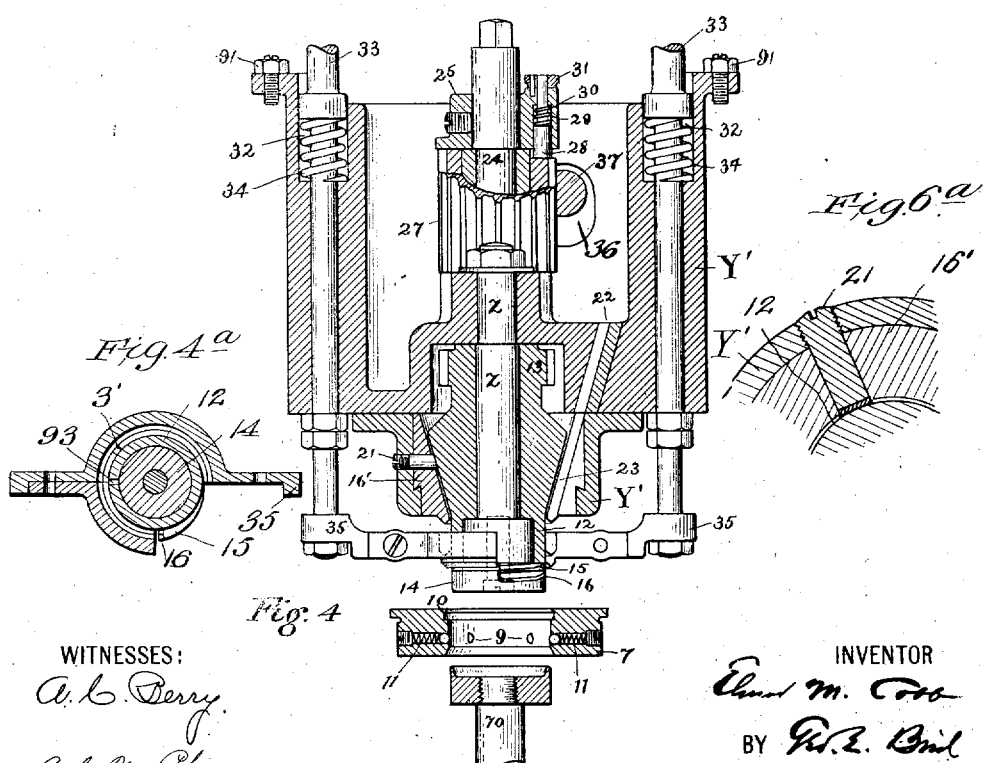
Figure 13:
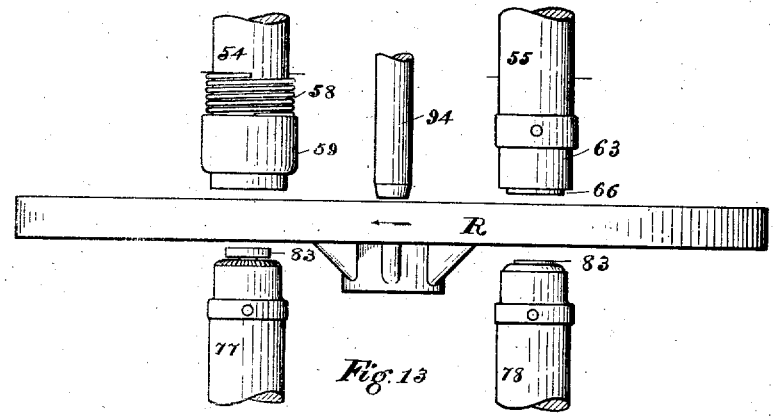
Figure 14:
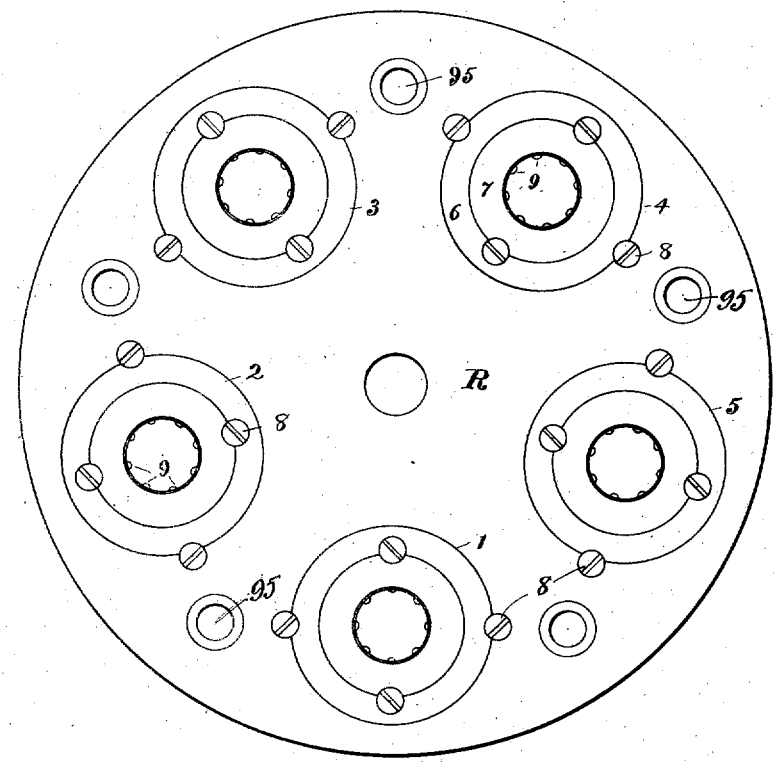

In the following description, reference is had to the accompanying drawings in which:

Figure 1 is a front elevation of the machine; Fig. 2 is a side elevation of the same; Fig. 3 is a top plan of the spiral forming head showing the rack for operating the same; Fig. 4 is a transverse vertical section on the line 1, 2 of Fig. 3 of the spiral forming head and of the die and plunger beneath the same; Fig. 4$^a$ is a cross section through the lower part of the mandrel and its related parts, the fastening screws being omitted. Fig. 5 is a top plan of the spiral forming head; Fig. 6 is a transverse horizontal section of the device for imparting a curvature to the ribbon on the line 3—4 of Fig. 7; Fig. 6$^a$ is an enlarged partial section showing the leather tip on the screw 21. Fig. 7 is a transverse vertical section of the spiral forming head on the line 1, 2 of Fig. 5; Fig. 7$^a$ is a detail showing the head 14 with separator and knife; Fig. 8 is a top plan of the cap feeding device; Fig. 9 is a transverse vertical section on the line 1, 2 of Fig. 8 of the same and a portion of the turret and die beneath with the magnetic plunger in side elevation; Fig. 10 is a detail showing the pathway cam and a cap resting upon the upper surface of the path; Fig. 11 is the same, the cap having passed under the path; Fig. 12 is a side elevation of the pathway cam; Fig. 13 is a side elevation of the revolving turret or disk and of the plungers whereby the under and upper edges of the ribbon of solder are affixed to the cap respectively and the corresponding plungers beneath; Fig. 14 is a top plan of the turret with the dies or carriers; Fig. 15 is a transverse vertical section of the die in the turret and the plungers whereby the ring of solder is affixed to the under side of the cap; Fig. 16 is a transverse vertical section of the die in the turret wherein the ring of solder is affixed to the upper side of the cap and of the top and bottom plungers operated therein; Fig. 17 is a transverse vertical section of the die in the turret and the plunger in side elevation whereby the finished cap is ejected from the machine; Fig. 18 is a top plan of the ring of solder as the same is deposited in the first die; Fig. 19 is a top plan of an unhemmed cap; Fig. 20 is a side elevation of the curved ring of solder with a portion of the same in vertical section on the line 1, 2 of Fig. 18; Fig. 21 is a side elevation with a portion in vertical section of the cap and ring of solder after the former has been deposited upon the latter in the second die; Fig. 22 is a side elevation with a portion in vertical section of the cap and ring after the under side of the latter has been affixed to the cap in the third die; and Fig. 23 is a side elevation with a portion in vertical section of the finished solder hemmed cap. Fig. 24 is a transverse vertical section of the die in the turret, showing the action of the plungers in impressing the ring of solder upon the cap. Figs. 25–33 are detail sectional views showing the positions successively assumed in severing a ring of solder and, hemming a cap therewith. Figs. 25 and 26 show the deposition of the lowest coil of the spiral of solder in the recess of the die and the severing of a solder ring while in said recess. Figs. 27 to 33 show successively the magnetized plunger passing up through the die and receiving a can cap, bringing it down and depositing it with its edge on the solder ring in the die, the ascending and descending plungers lifting the cap slightly, forcing its edge down into the solder ring and finally hemming the ring upon the cap, Fig. 33 showing the completed cap, ready to be ejected.

The mechanism in which I have embodied my invention comprises a device whereby a flat ribbon of solder may be formed into a spiral and a circle of solder automatically cut therefrom, the cap feeding device whereby the cap may be automatically deposited upon each ring of solder, devices whereby said ring may be hemmed upon the edge of the cap and suitable means whereby the various parts of the product may be presented to said devices in continuous rotation, and means whereby the finished product may be taken from the machine.

A suitable frame A supports the main shaft B of the machine which extends from side to side of the same, see Figs. 1 and 2. The shaft is provided with a gear C which meshes with the gear D upon the shaft E, which also carries the driving pulley F. The main shaft B is also provided near the center with similar cam wheels $a, a$ and at either end with wheels or pulleys G upon the inner side of each of which is a like camway. The shaft B is also provided at the side of the machine opposite the driving pulley F with the gear H which meshes with the gear I upon the shaft J. This gear I is provided upon its outer side with two pins K, K diametrically opposite adapted to enter the slots L, L upon the inner side of the wheel M, which slots are five in number, equidistant and radially located, see Fig. 2. The wheel M is carried upon the short shaft N which is provided at its other or inner end with a beveled gear O which meshes with the beveled gear P upon the vertical shaft Q which, being journaled in the frame of the machine, carries at its upper end the turret or revolving disk R. The gear I also meshes with the gear T upon the short shaft U which has at its inner end, near the center of the machine, the beveled gear V which meshes with the beveled gear W carried by the vertical shaft X.

The turret or revolving disk R is shown also in Figs. 13 and 14. It is provided with five equidistant openings 1, 2, 3, 4, 5. These openings are circular in form, of like diameter, and their centers are equidistant from the center of the disk and radially located with reference thereto. Within the openings 1—5 are placed annular shouldered rings 6 and within the rings the dies 7, as shown in Figs. 14, 15, 16 and 17, each being secured by means of screws 8, 8, as shown in Figs. 9 and 14. The openings in the dies flare or are beveled outwardly near the bottom and near the top are provided with a recess 10 above which the diameter of the opening is again decreased, leaving it slightly larger than the diameter of the opening below the recess 10. The perpendicular walls of the dies (between the recess 10 and the beveled portion) are provided with apertures for the retention of the ball bearings 9, which are kept in place and actuated by the springs 11, which are held by screws in the walls of the die 7.

Secured to the frame of the machine is a circular casting Y (see Figs. 1 and 2) which contains or supports the casing $Y^1$ in which are the means whereby the ribbon of solder is converted into a spiral and a circle of solder cut therefrom. The casing $Y^1$ is so located that its vertical center is directly over the centers of the openings 1—5 of the turret R as the latter revolves. It is constructed, preferably, in two parts, the lower, or that which supports the mandrel, being secured by bolts to the upper portion, see Figs. 4 and 7. Centrally secured within the casing $Y^1$ is the shaft Z which has a shoulder near the top and is again at its lower end considerably increased in diameter. An appropriate opening about the shaft Z and extending downward from its upper shoulder is made in the casing $Y^1$ for the reception of the mandrel 12 which rotates freely about the shaft Z. The mandrel 12 is preferably of the form shown in Fig. 4 being provided at the top with the gear 13 beneath which its walls are perpendicular for a short distance below which for a slight distance it diametrically increases and then again diminishes until below the casing $Y^1$ and about at the level of the lower enlargement of the shaft Z it is of uniform diameter. It is provided with the feather $3^x$ which extends upward for a short distance from its lower end.

Affixed to the lower end of the shaft Z is the head 14 substantially of the same diameter which, if desired for convenience, may be made in two parts as shown in Fig. 7. The head 14 carries the separator 15 and the cutter 16 or, if made in two parts, the separator is carried by the upper part and the cutter by the lower part, both the separator and cutter extending around the head sixty degrees, more or less. The separator 15 is wedge-shaped, with the sharp edge disposed against the direction of the rotation of the mandrel. The knife or cutter 16 is substantially of the form shown in Fig. 4, the cutting edge being under the thicker end of the separator 15. The inverted conical portion of the mandrel is surrounded within the lower portion of the casing $Y^1$ by a sleeve $16^1$ which is shown in horizontal section in Fig. 6 and which acts as a former or head. This sleeve has perpendicular outward walls with an upward inclined shoulder adapted to rest upon a like shoulder in the lower portion of the opening in the casing $Y^1$ while the inner wall is inclined from the bottom outward for the reception of the mandrel, see Fig. 4. The sleeve is continuous, excepting upon one side, where a segment or portion is removed for about twenty-five degrees of a circle, the wall of the aperture thus made being plain upon one side, but upon the other side being provided with a V-shaped protuberance as seen in Fig. 6. The segment or piece 17 is of like thickness and curvature with the sleeve $16^1$, and is provided upon one side with a groove adapted to receive the protuberance in the wall of the sleeve, and upon the other side near its inner edge it has a surface substantially parallel with the wall of the sleeve to which it is opposed, while the remainder of this wall of the piece 17 is inclined at an angle of about forty-five degrees with the inner portion of said wall, see Fig. 6. The piece 17 is provided with a threaded aperture for the reception of the screw 18, the surrounding casing $Y^1$ being provided with an elongated slot through which the screw may be inserted. The casing $Y^1$ is also provided with a projection 19 provided with screw ways and adapted to receive the screws 20, the ends of which contact with the piece 17. Preferably diametrically opposite the screw 18 the casing $Y^1$ is provided with a screw way and the sleeve $16^1$ with a circular opening adapted to receive the screw 21, the inner end of which screw may be tipped with leather or other frictional substance. The lower edge of the sleeve or head $16^1$ is V-shaped similarly to the side opposed to the segment 17, see Fig. 7, which side is rounded at the bottom, as also see Fig. 7. The casing $Y^1$ is provided with a channel 22 which registers with the V-shaped channel or opening 23 formed by the side of the sleeve and the side of the piece 17. In the rear of the shaft Z is another vertical shaft 24 which is provided near the top with a collar 25 fixed to the shaft by a set screw or other convenient means, see Figs. 3, 4, 5 and 7. The under surface of the collar 25 rests upon the sleeve 26 which is screwed into, or otherwise firmly fixed, to the interior casing $Y^1$.

Outside the sleeve 26 is the pinion rack gear 27 which at the top or upper end is cam-shaped, the surface being gradually removed from the upper end for about a quadrant of a circle terminating in a perpendicular notch, as seen in Figs. 4 and 7. Adapted to play upon the top of the gear 27 is the circular pin 28 held in the vertical sleeve 29 which may be attached to, or form part of, the collar 25. This sleeve is provided with a shoulder for the reception of the spring 30 which rests upon the upper portion of the lower or enlarged portion of the pin. The pin may be provided at the top with a thumb piece 31. The lower end of the shaft 24 has a gear $1^1$ meshing with the gear 13 of the mandrel 12. The walls of the casing $Y^1$ are provided at either side with shouldered openings 32 within which are the rods 33 which at the upper end of the casing are surrounded by the springs 34 and which at their upper ends are connected with the bracket $4^1$ depending from the housings 53 and at their lower ends are connected by the yoke 35. The central portion of the yoke is provided with a circular opening which is concentric with the shaft Z, surrounds the lower end of the mandrel 12 and is adapted to slide vertically about the same. While the lower portion of this central opening in the yoke is in contact with the lower end of the mandrel, the upper or larger portion of its height is of a distance from the mandrel equal to the width of the coiled ribbon and the lower portion is similar in form to that of the coiled ribbon. A portion, however, of the seat, slightly larger than that portion of the circumference of the head 14 occupied by the separator and knife 16, is removed to a sufficient width to permit the circular portion of the yoke to move over the separator 15 and the knife 16. The edge of this portion of the seat thus removed, which acts as a knife in conjunction with the knife 16, may be of the shape of the letter W and conforms to the shape of the end of the knife 16 in this respect.

The casting Y is provided with two circular apertures 36, one in front and one in the rear and the casing $Y^1$ with similar but elongated openings adapted to register with the openings 36, all which openings receive the rack 37 which is circular save upon the side occupied by the teeth. The rear end of this rack 37 is pivoted (through the medium of a collar, if desired) to the upper end of the crank 38 (see Fig. 2) the other end of which crank is pivoted to the crank 39, the head of which crank is pivoted upon the frame A. The arm of the crank 39 has a slot (indicated in dotted lines in Fig. 2) which receives and in which is operated a pin in the crank 40 fixed upon the upper end of the shaft X already described.

The cap dropper consists of a circular tube 41 fixed to the frame A of an interior diameter slightly larger than the diameter of the cap to be operated upon, see Figs. 8 and 9. The tube is so located that its center is at the same distance from the center of the turret as are the centers of the openings or carriers 1—5 of the turret. Three similar horizontal slots 42 are provided near the bottom of the tube for the reception of the pathway cams 43, see Fig. 12. These pathway cams, as shown in Fig. 12, are carried by a circular body provided with pintles at the top and bottom and beneath the upper pintles with a gear 44, beneath which, the diameter of the body being somewhat enlarged, are the pathway cams 43 which consist of a ledge nearly surrounding the body. The upper surface of this ledge at one end is removed for about ninety degrees of a circle forming a gradually descending path, while from the other end the under surface of the ledge is removed in corresponding manner so that at the end it presents practically a sharp edge which in the space of about one-quarter of the circumference increases to the normal depth of the ledge.

Inserted between the upper and lower portions of the frame A surrounding the tube 41 is an annular plate 45 which is provided on one side with an arm 46. The plate 45 is provided upon the upper surface with a circular projection 47 which is received by a corresponding recess in the frame of the machine. This plate or annulus has a sufficient opening to permit the installation of the pathway cams 43 within it, as hereinafter described, and the opening is provided with gear $2^1$ adapted to mesh with the gears 44 of the pathway cams. The pintles of the pathway cams are stepped or journaled in suitable openings in the frame A, the opening for the lower pintle being sufficiently large to allow adjustment by means of the rod 48 which is controlled by the spring 49 against the screw 50.

As before stated, the wheels G (see Figs. 1 and 2) are provided on the inner sides with cam ways. These cam ways receive pins upon the lower end of the rods 51 which project upward to some distance above the turret R and at their upper ends are connected by means of the cross-head 52. The cross-head 52 carries two housings 53 within which are secured the vertical plungers 54 and 55. The centers of these plungers are equidistant from the center of the turret R and are the same distance from the center of the turret R as are the centers of the openings 1—5. Above and below the cross-head 52 are suitable journals or boxes 56 in which the plungers 54 and 55 may slide. The plungers are of uniform diameter throughout, but differ in the construction and arrangement of their heads, see Figs. 15 and 16. The plunger 54 (see Fig. 15) whose office it is in connection with its under plunger 77 and the die to secure the ring of solder to the lower edge of the cap, is provided at the lower end with an annular portion 56, the lower portion 62 of which is threaded, on which is screwed the head 57. This head is of a diameter sufficient to permit it to pass below the recess 10. The head 57 is provided with a movable sleeve 59: see Fig. 15, which is surmounted by the coil spring 58. The sleeve is held in position by the screw 60, is of a diameter which allows it to descend as far as the bottom of the recess 10 and is at the lower or operative end beveled inwardly. The opening 61, like the opening 64, is simply for use in connecting the parts.

The plunger 55 (see Fig. 16) the office of which, with its under plunger and the die, is to press the upper portion of the hem upon the upper surface of the cap, is provided at the bottom with a circular aperture throughout, the upper part of which receives the threaded shank of the head 63. This head is at its operative end of a diameter slightly less than the diameter of the opening above the recess 10. The head 63 has a central aperture for the reception of the screw 65, the lower end of which carries or holds the inner head 66, the diameter of which is somewhat shorter than the distance between the upper edges of the hem when pressed upon the cap. Surrounding the screw 65 between the shoulder in the aperture of the head 63 and the top of the head 66 is a coil spring $2^2$. The internal head 66 is concave and the annular portion of the head 63 is beveled, as seen in Fig. 16. The plunger 67, whose office it is to eject the finished product from the die, is supported and held by a bracket 68 attached to the cross-head 52. This plunger 67 terminates in a circular plate $67^a$ of slightly less diameter than the smallest diameter of the opening in the die. It is concave from its edges inward. Directly beneath the head 14 and concentric with the shaft Z (see Figs. 4 and 7) is the vertical plunger 70 which is journaled in the frame of the machine. It is shown in detail in Fig. 4 and has a head with a concave upper surface, the diameter of the head being slightly less than the diameter between the perpendicular walls of the dies. Pivoted to the plunger 70 is the arm 71 which near the center is pivoted to the frame of the machine and at the other end is pivotally connected with the arm 72 which near its center $72^a$ is pivoted to the frame of the machine, while the rear or other end is pivoted to the side of the plunger 78 by means of a pin $73^a$ which projects through a vertical opening in the box 79. Secured to the rod or plunger 70 is the bracket 73 which carries the plunger 74. This is so located that its vertical center is in the same line with the vertical center of the cap dropper. The upper part or head 75 of the plunger 74 is shown in detail in Fig. 9. Its upper outer edge is beveled while the surface of the head is concave, as shown in dotted line in Fig. 9. The diameter of the plunger is somewhat less than the shortest diameter of the dies. The head 75 should be made of steel and magnetized.

The cam wheels $a$, $a$ (see Fig. 1) upon the shaft B, already described, support and actuate, through the medium of the rollers 76, the plungers 77 and 78 which are journaled in the boxes 79. The plungers 77 and 78 are shown in detail in Figs. 15 and 16 respectively. The plunger 77 is provided with a head the diameter being somewhat less than that of the plunger and slightly less than the diameter of the perpendicular walls of the dies. The head is provided with a recess 80 and an internal opening adapted to receive the rod 81 and the spring 82. The top of the rod 81 is provided with a head 83 adapted to be received in the circular slot 80 of the head. The side of the plunger may have a vertical slot 84 through which into an appropriate screw-way in the rod 81 may be inserted the screw 85. Upon the opposite side in an appropriate screw-way is inserted the frictional screw 86. The upper head or end of the plunger 78 is of similar construction to that of the upper end or head of the plunger 77, see Figs. 15 and 16, the diameter of each head being the same. The diameter of the recess in the head is the same and the opening substantially as in Fig. 15. The bevel of the head outside of the recess 80, however, is less rounded than the bevel of the head in Fig. 15. In Fig. 16 the rod 81 is provided with a slot 87 into which, through an appropriate screw-way in the slide of the plunger 78, is inserted the screw 88.

A device for locking the turret or disk is shown in Figs. 13 and 14, consisting of a pin 94 and openings 95 adapted to receive it in the disk R. These apertures 95 are five in number radially located and equidistant from each other and the center of the turret. The pin 94 is also shown in Fig. 2. It extends upward vertically in appropriate bearings and is secured by a set screw 96 to the housing 53.

The operation of the mechanism above-described is as follows: A ribbon of solder of uniform thickness and width is fed over a pulley 90 journaled at the top of the machine above the forward part of the casing Y¹. The ribbon is carried downward through the channel 22 into the curved or V-shaped channel 23, see Figs. 4, 5, 6 and 7. As it is carried through the passage or channel 23, the ribbon assumes the contour from side to side of the passage and becomes V-shaped or curved as the channel is V-shaped or curved, the size of the channel being increased or diminished by means of the segmental piece 17 and the screws 18 and 20. It is then carried by hand as before around the mandrel 12 within the grooved portion or recess of the yoke and the end may be inserted in the groove 93 in the lower portion of the mandrel 12 (see Fig. 7). Power is now applied to the machine by means of the lever 89 and the pin 28 being in contact with the notch in the top of the gear 27, the mandrel 12 is caused by means of the gears I¹ and 13 to make one revolution. When, however, by the revolution of the shaft X, which actuates the gear 27, the rack 37 is withdrawn or reciprocated the pin 28 sliding upward upon the cam-faced portion of the upper end of the gear 27 no motion is imparted to the shaft 24. Upon the next forward movement of the rack 37, the pin 28 again contacts with the notch and another revolution of the mandrel 12 follows making another coil of the spiral as before. After several coils of the spiral have been thus made, sufficient in number by their friction aided by the feather 3¹ to hold the spiral formed about the mandrel, the end is removed from the vertical slot 93 in the mandrel and is carried down between the separator 15 and the knife 16. The machine being again started, with the next revolution of the mandrel 12 another ring is formed carrying the lower ring of the spiral formed at the previous revolution of the mandrel 12 between the separator 15 and the knife 16, when the rods 33 are depressed as the plungers 54 and 55 descend. As the plungers 54 and 55 descend, the pin 94 also descends, its lower end entering the aperture 95 in the turret or disk R, thus holding the disk and preventing its movement until the various operations carried on in the dies are performed and the plungers are again elevated when the pin also rises releasing the disk. The inner casing Y¹ is also carried downward causing the head 14 to enter the die (say that in the opening 1) until the lower edge of the knife 16 is about at the same level with the lower edge of the recess 10, when the downward movement of the inner casing Y¹ is arrested. At the same time the plunger 70 is elevated until it receives within the recess in its upper end the head 14. When the head and the plunger 70 have assumed this position, the rods 33, continuing their downward movement, cause the yoke to slide over the lower end of the mandrel and the knife upon the yoke and the head to cut a complete ring from the spiral, which is received in the recess 10 where it is slightly flattened or expanded by the outer edges of the plunger 70. This done the plunger 70 descends while the inner casing Y¹ and the yoke 35 return upward to their former position. The cap dropper is now filled with caps and the die (1) with the ring of solder therein with the next motion of the turret and, while the next ring of solder is being formed, is carried beneath the cap dropper which in the meantime by a partial revolution of the camway paths 43, which are rotated by means of the arm 46, has carried the cap from the top to the under side of the pathway 43, whence it drops upon the magnetized head of the plunger 75 which has been carried upward above the upper surface of the plate 7 and as it is again depressed, it deposits the cap upon the upper surface of the ring of solder. The next revolution of the turret carries the die (1) beneath the plunger 54, see Figs. 1 and 15, the next dies (2 and 3) respectively being beneath the cap dropper and the spiral forming head. While the operations of dropping the cap and cutting the ring are proceeding, as before, over the dies (2 and 3), the plunger 77 ascends, its head 83 being advanced (in the position shown in Fig. 15) and raises the cap from out the recess 10 until it meets the descending sleeve 59 of the plunger 54 (the sleeve by reason of the spring 58 descending in advance of the head 57). The head 83 carries the cap into contact with the beveled edges of the sleeve 59 until it is forced up within the sleeve in contact with the head 57. The plunger 54 still descending carries the cap downward against the pressure of the head 83 upon the upper surface of the ring of solder in the recess 10 where it is met by the head 80 which in the meantime has been ascending and which at this point begins to descend by which movement the ring of solder and the cap are forced below and out of the recess 10 turning up the outer edge of the solder ring and pressing between the head 57 and the head 80 the under edge of the solder ring upon the under edge of the cap. As the plunger 54, after completion of the operation, is withdrawn, the plunger 77 still descending, the cap with the ring of solder attached to the under edge thereof is left resting upon the ball bearings 9. With the next movement of the turret the die (1) is carried beneath the plunger 55 and, while the operations of fixing the under edge of the solder ring to the under side of the cap, dropping the cap and the formation of and cutting of the ring of solder are proceeding over the dies (2, 3 and 4), the plunger 55 descends until the beveled edge of its head 63 reaches the lower horizontal wall of the recess 10 in the die where its action is arrested. While the plunger 55 is descending, the plunger 78 is rising and as it rises the inner head 83 carries the cap upward from off the ball bearings 9 in the die until the upper surface of the central portion of the cap rests against the inner head 66 of the plunger 55, when, the plunger 78 still rising, the beveled sleeve or outer portion or annulus of the plunger 78 forces the edge of the cap upward against the beveled edge of the head 63 of the plunger 55, thus depressing the upper edge of the solder ring down upon the upper edge of the cap and at the same time raising the inner head 66 of the plunger 55. The plunger 78 now descends while the upper plunger 55 ascends, the inner head 66 of the plunger 55 halting under the influence of the spring $2^a$ long enough before it leaves the die to force the hemmed cap downward until it rests upon the ball bearings of the die. The next movement of the turret carries the completed ring beneath the ejector 67 and, while the operations, already described, are going on and over the dies (2, 3, 4 and 5), the plunger 67 descends and pushes the completed cap from the ball bearings 9 into the proper receptacle.

What I claim is:

1. In a machine for hemming caps, the combination of means whereby a ribbon of solder may be drawn into a spiral of superposed convolutions, means whereby the lowermost convolution of said spiral may be separated from the remainder, and means whereby from the part so separated a complete circle may be cut, substantially as described.

2. In a machine for hemming caps, the combination of means for drawing a ribbon of solder into a spiral of super-posed convolutions, means whereby the lowermost convolution of said spiral may be separated from the remainder thereof, means whereby a ring may be cut from said lower portion of said spiral, and means for placing the cut ring in a die, substantially as described.

3. In a machine for hemming caps, the combination of means for converting a ribbon of solder into a spiral bent in cross section, means whereby the lower portion of said spiral may be separated from the remainder thereof, means whereby a ring may be cut from the said lower portion of said spiral, and means for placing the cut ring in a die, substantially as described.

4. In a machine for making solder-hemmed caps, a circular die having near the top a horizontal shouldered recess, the diameter of said die being slightly larger above said recess than the diameter thereof beneath said recess, substantially as described.

5. In a machine for making solder-hemmed caps, a circular die having near the top a horizontal shouldered recess and at the bottom a flaring outlet, substantially as described.

6. In a machine for making solder-hemmed caps, a circular die having near the top a horizontal shouldered recess, the diameter of said die being slightly larger above said recess than the diameter thereof beneath said recess, and having also at the bottom a flaring outlet, substantially as described.

7. In a machine for making solder-hemmed caps, a circular die provided with apertures in its interior wall and balls adapted to protrude part way through said apertures and springs whereby said balls may be actuated, substantially as described.

8. In a machine for making solder-hemmed caps, a circular die having near the top a horizontal shouldered recess, the interior wall of said die being provided with apertures below said recess, balls adapted to protrude part way through said apertures and springs whereby said balls may be actuated, substantially as described.

9. In a machine for making solder-hemmed caps, a circular die having near the top a horizontal shouldered recess and at the bottom a flaring outlet provided with apertures above said outlet, and balls adapted to protrude part way through said apertures, and suitable springs for actuating the same, substantially as described.

10. In a device for dropping caps, the combination of a tube provided with openings in its wall, circular ledges projecting into said tube through said openings, said ledges being provided with similarly-inclined paths, and means whereby said ledges may be operated simultaneously, whereby the cap resting upon the upper surface of said ledges may be allowed to pass beneath the same and to drop with accuracy, owing to the extension of the tube, which serves as a guide, substantially as described.

11. In a cap-dropping machine, the combination of a tube provided with openings in its wall, and adapted to receive and hold said caps one upon the other, circular ledges forming a support, said ledges projecting through said openings, and means whereby said ledges may be operated simultaneously, whereby the cap resting upon said ledges is carried beneath the same and discharged from said holder with accuracy, owing to the extension of the tube which serves as a guide, substantially as described.

12. In a cap-dropping machine, the combination of a tube provided with openings in its wall and adapted to receive the caps, ledges provided with similarly-inclined openings and projecting through the openings in said wall, and means for operating said ledges, whereby the lowest cap resting thereon may be allowed to be carried through the openings in said ledges and discharged from said tube with accuracy, owing to the extension of the tube which serves as a guide, substantially as described.

13. In a cap-dropping machine, the combination of a tube provided with openings in its wall and adapted to receive the caps, ledges projecting through said openings and adapted to sustain the column of caps in said tube, said ledges being provided with similarly-inclined openings through the same, and means for revolving said ledges, whereby the lowermost cap with each revolution of said ledges will pass through said inclined openings in said ledges and drop with accuracy, owing to the extension of the tube which serves as a guide, substantially as described.

14. In a machine for dropping caps, the combination of a tube adapted to receive a column of said caps, pinions provided with circular ledges, said ledges projecting through suitable openings in said tube, and provided with similar inclined openings through the same, means whereby said pinions may be automatically adjusted with reference to the center of said tube and means whereby said pinions may be operated simultaneously, substantially as described.

15. In a machine for hemming caps, the combination of a die provided near the top with a horizontal shouldered recess, and beneath said recess with protruding spring-actuated balls, a descending plunger provided with a spring-actuated sleeve, and an ascending plunger provided with a core and a beveled rim, whereby the under edge of the ring of solder may be impressed upon the under edge of the cap at the same time that said ring of solder passes out through said recess, substantially as described.

16. In a machine for hemming caps, the combination of a die provided with a horizontal shouldered recess near the top, a descending plunger provided with a spring-actuated sleeve, and an ascending plunger provided with a core and a beveled rim, whereby the under edge of the ring of solder may be impressed upon the under edge of the cap at the same time that said ring of solder is depressed out from said recess, substantially as described.

17. In a machine for hemming caps, a die provided with spring-actuated balls, as described, a descending plunger provided with a spring-actuated core with an inwardly beveled rim, and an ascending plunger having an outwardly beveled rim and a spring-actuated core, whereby the upper edge of the ring of solder may be depressed upon and attached to the upper surface of the cap, substantially as described.

18. In a machine for hemming caps, the combination of a die substantially as described, a descending plunger provided with a spring-actuated core with an inwardly beveled rim and an ascending plunger having an outwardly beveled rim and a spring-actuated core, whereby the upper edge of the ring of solder may be depressed upon and attached to the upper surface of the cap, substantially as described.

19. In a machine for making solder-hemmed caps, a circular die provided with apertures in its interior walls, balls adapted to project part way through said apertures, springs whereby said balls may be actuated, and a descending plunger, substantially as described.

20. In a machine for making solder-hemmed caps, the combination of a rotary shaft, a stationary former or head surrounding the same, and around which shaft the solder is wound in the form of a coil, and a feather projecting from said shaft below said head, whereby backward movement of the coil is prevented, substantially as described.

21. The combination of a casing containing means for forming a coiled ribbon of metal and means whereby said casing may be alternately depressed and raised, substantially as described.

22. The combination of a casing containing a mandrel and operative means whereby a ribbon of metal may be formed into a spiral, means for raising and depressing said casing, a yoke surrounding the lower end or head of said mandrel, said yoke and head being provided with means adapted to cut a ring from said spiral, and means for depressing and raising said yoke, substantially as described.

23. The combination of a casing containing a mandrel and operative means whereby a ribbon of solder may be formed into a spiral, means whereby the lower ring of said spiral may be separated from said spiral, a yoke surrounding the lower end or head of said mandrel, said yoke and head being provided with means adapted to cut a ring from said spiral, and means for depressing and raising said yoke, substantially as described.

24. A machine for forming wire-solder rings and applying them to metal caps, comprising a wire solder supply, means for shaping the wire solder to the form of a ring, means for cutting the ring of solder from the supply, and means for placing the cap upon said ring, substantially as described.

25. A machine for supplying solder for attachment to metal caps comprising a wire-solder supply, a pendent mandrel around which the solder is wrapped in a plurality of coils, a cutter-blade near the end of said mandrel, means coöperating with said blade to cut the lowest coil, and means for holding the uncut coils on the mandrel, substantially as described.

26. A machine for applying solder to metal caps, comprising a carrier, a plurality of cap holders in said cap carrier, means for forming a spiral of solder, means adjacent the carrier for cutting the spiral in pre-determined lengths, and means for moving the carrier to present the holders and cut solder thereon in succession to receive the caps, substantially as described.

27. A machine for applying solder to metal caps comprising a plurality of cap-holders, a wire-solder supply, and means for cutting the wire-solder in pre-determined lengths, and means for presenting the cap-holders and caps successively to receive the solder as it is cut, substantially as described.

28. In a machine for hemming caps, the combination of a die provided near the top with a horizontal shouldered recess and beneath said recess with protruding spring-actuated balls, a descending plunger provided with a spring-actuated sleeve, an ascending plunger provided with a beveled rim and a central opening containing a rod, a friction device for controlling the movement of said rod, and a pin fixed in said rod adapted to contact with the frame of the machine, whereby the under edge of the ring of solder may be impressed upon the under edge of the cap at the same time that the ring of solder passes downward through said recess, substantially as described.

29. In a machine for making solder-hemmed caps, the combination of a rotary shaft, a stationary former or head surrounding the same, and a friction device in contact with said shaft, whereby backward movement of said shaft is prevented, substantially as described.

30. In a machine for making solder-hemmed caps, the combination of a rotary shaft, a stationary former or head surrounding the same, a feather projecting from said shaft below said head, whereby backward movement of the coil is prevented, and a friction device in contact with the shaft whereby backward movement of said shaft is prevented, substantially as described.

31. In a machine for making solder hemmed caps, the combination of a rotary shaft, a stationary former surrounding said shaft, a stationary head beneath said former, a knife, having an indented end, secured to said head, a yoke extending partially around said shaft, one end of which yoke coöperates with the end of said knife to cut the solder with an indented end, and means for intermittently depressing said yoke, substantially as described.

32. In a machine for hemming caps, a mandrel around which the solder is wrapped to shape it, a wedge whereby the end wrapping of solder on the mandrel is separated from the remainder, and means whereby from the part so separated a complete circle may be cut, substantially as described.

33. A machine for supplying solder rings for attachment to metal caps, comprising a wire-solder supply, a pendent mandrel around which the solder is wrapped in a plurality of coils, a wedge whereby the lowest coil may be separated from the remainder, and means whereby from the part so separated a complete circle may be cut, substantially as described.

34. In a machine for hemming caps, the combination of a die provided near the top with a horizontal shouldered recess adapted to receive and hold a ring of solder, a descending plunger and an ascending plunger, said plungers being adapted to meet within said die in the plane of said recess, substantially as described.

35. In a machine for hemming caps, the combination of a die provided near its top with a horizontal shouldered recess adapted to receive and hold a ring of solder, a descending plunger and an ascending plunger, said plungers being adapted to meet within said die in the plane of said recess, whereby the ring of solder may be impressed upon the under side of the cap and the ring of solder then carried downward out of said recess in the descending action of both plungers, substantially as described.

36. In a machine for making solder-hemmed caps, the combination of a device for dropping caps one by one, and a circular die, said die being provided with apertures in its interior wall, balls protruding part way through said apertures, and springs whereby said balls are yieldingly held, substantially as described.

37. In a machine for making solder-hemmed caps, the combination of an automatic cap-dropper, a circular die, and a magnetized plunger adapted to reciprocate vertically through said die and into the lower part of the cap dropper, whereby each cap is centered and when dropped is carried downward to a pre-determined place inside of said die, substantially as described.

38. In a machine for hemming caps, the combination of a mandrel around which the solder is wrapped in a close coil to shape it, a stationary part having thereon a projecting part whereby the end wrapping of solder on the mandrel is first separated from the remainder, and means whereby from the part so separated a complete circle may afterward be cut, substantially as described.

39. A machine for supplying solder rings for attachment to metal caps, comprising a wire solder supply, a pendent mandrel, a stationary part having thereon a projecting part whereby the end wrapping of the solder may be first separated from the remainder, and means whereby from the part so separated a complete circle may be afterward cut, substantially as described.

40. In a machine for hemming caps, the combination of a die having spring-actuated balls therein and a downwardly descending plunger, whereby the finished product is finally ejected from the machine by the action of said plunger and balls, substantially as described.

41. In a machine for forming wire solder rings and applying them to metal caps, the combination of a wire solder supply, means for drawing the wire solder into a spiral of super-posed convolutions, means for cutting a ring of solder from the solder thus shaped, and means for hemming the caps with said wire solder rings, substantially as described.

42. In a machine for hemming caps, the combination of means for converting a strip of solder into a spiral of several turns, and means whereby the lower turn of said spiral may be separated from the remainder and then cut off, substantially as described.

43. In a machine for hemming caps, the combination of means whereby a strip of solder may be drawn into a spiral of several turns and simultaneously bent in cross section, means whereby the lower turn of said spiral may be separated from the remainder, and means whereby a ring of solder may be made from the separated portion, substantially as described.

44. In a machine for hemming caps, the combination of a shaft, a stationary former or head around which the solder is adapted to be coiled in a spiral, and a feather projecting from said shaft below said head, and cutting in succession into each turn of said spiral, whereby backward movement of the coil is prevented, substantially as described.

45. In a machine for hemming caps, the combination of a die provided in its wall with a recess, and also beneath said recess with spring actuated balls projecting through said wall, and ascending and descending plungers adapted to meet within said die, whereby a ring of solder may be pressed upon the underside of a cap and then depressed over said recess and allowed to rest upon said balls, substantially as described.

46. In a machine for making solder hemmed caps, the combination of means for providing rings of solder, a turret having a plurality of dies therein adapted to receive said rings in succession, means for revolving said turret, and a cap dropping device including means for holding a vertical column of caps, and mechanism for separating the caps from said column one by one and delivering them in succession upon said rings in said dies, substantially as described.

47. The combination of mechanism for bending or curling a wire into a rim-blank and forming the blank to embrace the edge of an article, and means for compressing the rim on the edge of the article to secure it thereto, substantially as set forth.

48. The combination of mechanism for bending or curling a wire into a rim-blank, means for forming said blank into a flanged rim, and means for applying said flanged rim to the edge of an article, substantially as set forth.

49. The combination of means for bending or curling a wire or strip into a rim-blank, means for severing said rim-blank from the wire or strip, means for forming said rim-blank into a flanged rim, and means for applying said flanged rim to the edge of an article, substantially as set forth.

50. The combination of means for curling or bending a wire into a rim-blank, means for forming said blank into a flanged rim, means for applying said rim to the edge of an article, and operating mechanism for said blank and rim forming and rim applying means substantially as set forth.

51. The combination of means for bending or curling a wire into a rim-blank and severing said blank from the wire, means for forming said blank into a flanged rim, means for applying said rim to the edge of an article, and operating mechanism for said blank and rim forming and rim applying means, substantially as set forth.

52. In a machine for providing caps or the like with flanged rims, the combination of means for forming a wire into a blank of the circumferential shape of the cap, means for flanging said blank, means for securing said flanged blank on the cap, and operating mechanism for said blank forming and flanging means, substantially as set forth.

53. In a machine for providing caps or the like with flanged rims, connected mechanism for forming a wire into a blank of the circumferential shape of the cap, flanging said blank and securing the flanged blank on said cap in successive operations, substantially as set forth.

54. The combination of a form, means for forcing the wire endwise into said form to curl it into a blank of the shape of the form, means for severing said blank from the wire, means for forming said blank into a flanged rim, and operating mechanism for said several means, substantially as set forth.

55. The combination of a circular form, means for forcing a wire into said form to curl it into a circular blank, means for severing said blank from the wire and moving it out of said form, means for forming said blank into a flanged rim, and operating mechanism for said several means, substantially as set forth.

56. The combination of a circular form, means for forcing a wire into said form to curl it into a circular blank, means for severing said blank from the wire and moving it out of said form, means for forming said blank into a flanged rim, means for closing the flanges of said rim over the edge of a cap, and operating mechanism for said several means, substantially as set forth.

57. The combination of a form having a blank curling cavity, a movable blank support, and a movable plunger, and mechanism for feeding a wire into said form, withdrawing said blank support and operating said plunger to sever said blank from the wire and eject the blank, substantially as set forth.

58. In a cap-hemming machine, a plurality of active dies, a coacting receptive die, means for depositing a cap upon the receptive die, means for bringing said die into successive positions under said active dies, which perform the hemming operation, and means for expelling the hemmed cap from said die in its final position, substantially as described.

In testimony, that I claim the foregoing as my invention I have hereunto set my hand this thirty-first day of October, A. D. 1908.

ELMER M. COBB.

Signed in presence of—
GEO. E. BIRD,
EDWARD M. LANG, Jr.

DISCLAIMER.

1,009,474.—*Elmer M. Cobb*, South Portland, Me. MACHINE FOR MAKING SOLDER-HEMMED CAPS. Patent dated November 21, 1911. Disclaimer filed August 1, 1913, by the assignee, *Edward M. Lang, jr.*

Enters this disclaimer—

"To claims numbered 54, 55, 56, and 57 in said specification, which are in the following words, to wit:

"54. The combination of a form, means for forcing the wire endwise into said form to curl it into a blank of the shape of the form, means for severing said blank from the wire, means for forming said blank into a flanged rim, and operating mechanism for said several means, substantially as set forth.

"55. The combination of a circular form, means for forcing a wire into said form to curl it into a circular blank, means for severing said blank from the wire and moving it out of said form, means for forming said blank into a flanged rim, and operating mechanism for said several means, substantially as set forth.

"56. The combination of a circular form, means for forcing a wire into said form to curl it into a circular blank, means for severing said blank from the wire and moving it out of said form, means for forming said blank into a flanged rim, means for closing the flanges of said rim over the edge of a cap, and operating mechanism for said several means, substantially as set forth.

"57. The combination of a form having a blank curling cavity, a movable blank support, and a movable plunger, and mechanism for feeding a wire into said form, withdrawing said blank support and operating said plunger to sever said blank from the wire and eject the blank, substantially as set forth."

[OFFICIAL GAZETTE, *August 19, 1913.*]

securing said flanged blank on the cap, and operating mechanism for said blank forming and flanging means, substantially as set forth.

53. In a machine for providing caps or the like with flanged rims, connected mechanism for forming a wire into a blank of the circumferential shape of the cap, flanging said blank and securing the flanged blank on said cap in successive operations, substantially as set forth.

54. The combination of a form, means for forcing the wire endwise into said form to curl it into a blank of the shape of the form, means for severing said blank from the wire, means for forming said blank into a flanged rim, and operating mechanism for said several means, substantially as set forth.

55. The combination of a circular form, means for forcing a wire into said form to curl it into a circular blank, means for severing said blank from the wire and moving it out of said form, means for forming said blank into a flanged rim, and operating mechanism for said several means, substantially as set forth.

56. The combination of a circular form, means for forcing a wire into said form to curl it into a circular blank, means for severing said blank from the wire and moving it out of said form, means for forming said blank into a flanged rim, means for closing the flanges of said rim over the edge of a cap, and operating mechanism for said several means, substantially as set forth.

57. The combination of a form having a blank curling cavity, a movable blank support, and a movable plunger, and mechanism for feeding a wire into said form, withdrawing said blank support and operating said plunger to sever said blank from the wire and eject the blank, substantially as set forth.

58. In a cap-hemming machine, a plurality of active dies, a coacting receptive die, means for depositing a cap upon the receptive die, means for bringing said die into successive positions under said active dies, which perform the hemming operation, and means for expelling the hemmed cap from said die in its final position, substantially as described.

In testimony, that I claim the foregoing as my invention I have hereunto set my hand this thirty-first day of October, A. D. 1908.

ELMER M. COBB.

Signed in presence of—
GEO. E. BIRD,
EDWARD M. LANG, Jr.

DISCLAIMER.

1,009,474.—*Elmer M. Cobb*, South Portland, Me. MACHINE FOR MAKING SOLDER-HEMMED CAPS. Patent dated November 21, 1911. Disclaimer filed August 1, 1913, by the assignee, *Edward M. Lang, jr.*

Enters this disclaimer—

"To claims numbered 54, 55, 56, and 57 in said specification, which are in the following words, to wit:

"54. The combination of a form, means for forcing the wire endwise into said form to curl it into a blank of the shape of the form, means for severing said blank from the wire, means for forming said blank into a flanged rim, and operating mechanism for said several means, substantially as set forth.

"55. The combination of a circular form, means for forcing a wire into said form to curl it into a circular blank, means for severing said blank from the wire and moving it out of said form, means for forming said blank into a flanged rim, and operating mechanism for said several means, substantially as set forth.

"56. The combination of a circular form, means for forcing a wire into said form to curl it into a circular blank, means for severing said blank from the wire and moving it out of said form, means for forming said blank into a flanged rim, means for closing the flanges of said rim over the edge of a cap, and operating mechanism for said several means, substantially as set forth.

"57. The combination of a form having a blank curling cavity, a movable blank support, and a movable plunger, and mechanism for feeding a wire into said form, withdrawing said blank support and operating said plunger to sever said blank from the wire and eject the blank, substantially as set forth."

[OFFICIAL GAZETTE, *August 19, 1913.*]

DISCLAIMER.

1,009,474.—*Elmer M. Cobb*, South Portland, Me. MACHINE FOR MAKING SOLDER-HEMMED CAPS. Patent dated November 21, 1911. Disclaimer filed August 1, 1913, by the assignee, *Edward M. Lang, jr.*

Enters this disclaimer—

"To claims numbered 54, 55, 56, and 57 in said specification, which are in the following words, to wit:

"54. The combination of a form, means for forcing the wire endwise into said form to curl it into a blank of the shape of the form, means for severing said blank from the wire, means for forming said blank into a flanged rim, and operating mechanism for said several means, substantially as set forth.

"55. The combination of a circular form, means for forcing a wire into said form to curl it into a circular blank, means for severing said blank from the wire and moving it out of said form, means for forming said blank into a flanged rim, and operating mechanism for said several means, substantially as set forth.

"56. The combination of a circular form, means for forcing a wire into said form to curl it into a circular blank, means for severing said blank from the wire and moving it out of said form, means for forming said blank into a flanged rim, means for closing the flanges of said rim over the edge of a cap, and operating mechanism for said several means, substantially as set forth.

"57. The combination of a form having a blank curling cavity, a movable blank support, and a movable plunger, and mechanism for feeding a wire into said form, withdrawing said blank support and operating said plunger to sever said blank from the wire and eject the blank, substantially as set forth."

[OFFICIAL GAZETTE, *August 19, 1913.*]